United States Patent [19]

Miller

[11] Patent Number: 4,791,483

[45] Date of Patent: Dec. 13, 1988

[54] ADAPTIVE DIFFERENTIAL PULSE CODE MODULATION VIDEO ENCODER

[75] Inventor: Robert L. Miller, Penn Valley, Calif.

[73] Assignee: The Grass Valley Group, Inc., Grass Valley, Calif.

[21] Appl. No.: 123,402

[22] Filed: Nov. 20, 1987

[51] Int. Cl.$^4$ .................... H04N 7/13; H04N 11/04
[52] U.S. Cl. .................................. 358/135; 358/13; 358/138; 375/27
[58] Field of Search ............... 358/135, 136, 133, 138, 358/12, 13; 375/27

[56] References Cited

U.S. PATENT DOCUMENTS

| 4,151,550 | 4/1979 | Dinstein | 358/13 |
| 4,603,347 | 7/1986 | Kuroda | 358/13 |
| 4,622,579 | 11/1986 | Starck | 358/13 |

FOREIGN PATENT DOCUMENTS

| 58-039181 | 3/1983 | Japan | 358/12 |
| 60-086989 | 5/1985 | Japan | 358/21 R |

*Primary Examiner*—Howard W. Britton
*Attorney, Agent, or Firm*—Francis I. Gray

[57] ABSTRACT

An adaptive DCPM video encoder operates directly upon a digitized composite video signal to generate a bit reduced serial digital output signal. The encoder has a feed back loop in the form of a recursive filter with zero's at d.c. and the color subcarrier frequency of the digitized encoded video signal that determines a predicted value for subtraction from the digitized composite video signal to produce a difference signal having the color subcarrier frequency nulled out. The difference signal is quantized to produce a quantized difference signal from which the predicted value is derived. An inner loop determines from the quantized difference signal an offset value from which the presence of large step transitions in the digitized encoded video signal are detected. For large step transitions the offset signal is subtracted from the difference signal to produce an offset difference signal for input to the quantizer. All adders and subtractors use modulo summing techniques to reduce the size of their outputs by one bit. The quantization transfer function for the quantizer is non-linear, having fine resolution near zero and coarse resolution away from zero. A plurality of quantization transfer functions are selectable according to the size of the step transitions as determined from the quantized difference signal. For digitized composite video signal samples near the maximum and minimum values when wrap around occurs due to quantization errors, a clip logic circuit selects a clipped quantized difference signal for output from the quantizer.

20 Claims, 8 Drawing Sheets

ADAPTIVE DIFFERENTIAL PULSE CODE MODULATION VIDEO ENCODER

BACKGROUND OF THE INVENTION

The present invention relates to digital encoders and more particularly to an adaptive differential pulse code modulation (DPCM) video encoder which directly encodes a digitized composite video signal and converts it to a serial, data reduced, bit stream for transmission over a telecommunications network.

Differential Pulse Code Modulation (DPCM) is a useful code conversion technique for sampled signals which have a high sample to sample correlation. The differences between samples of a digitized input signal are transmitted and then added at a receiver to reconstruct the original signal. This is accomplished by subtracting a predicted value, i.e., the prior sample value, from the current sample value. If the resulting difference between the predicted value and the current sample value is small for most of the samples, then the effectiveness of bit reduction techniques, such as non-linear quantization or entropy coding of the differences, are enhanced. Unless the sampling rate is inordinately high, however, adjacent samples of a composite video signal, such as NTSC or PAL, are not well correlated due to the high frequency subcarrier oscillations impressed upon the video signal by the color encoding process, and the DPCM differences are not small. Hence it is common practice to first decode the composite video signal into a luminance and two color difference signals, each of which exhibits high sample to sample correlation. Code conversion techniques, such as DPCM, can then be applied to these signals separately. The primary disadvantages of such a practice are the cost of the required composite video decoder and the added burden of processing three sampled signals rather than one.

What is desired is an adaptive DPCM video encoder which operates directly upon the composite video signal without the need for decoding and parallel processing of three components.

SUMMARY OF THE INVENTION

Accordingly the present invention provides an adaptive differential pulse code modulated (DPCM) video encoder for directly encoding a composite video signal for transmission over a telecommunications network. A digitized composite video signal is input to a summing circuit which subtracts a predicted value from the input. The differential value from the summing circuit is quantized for data reduction and converted to a serial signal for transmission. The quantized differential value is input to another summing circuit to which also is added the predicted value. The output of the second summing circuit is input to a predictor circuit from which is obtained the predicted value. The predictor circuit is configured to provide the predicted value at the same point on the subcarrier frequency cycle as the input digitized composite video signal, i.e., the predicted value has a subcarrier component in phase with the color subcarrier component of the input composite video signal, so as to null out the subcarrier frequency component. A non-linear quantization technique is used with a double quantization loop to provide rapid reaction to luminance transitions while providing a fine quantization scale for small signal variations.

The objects, advantages and other novel features of the present invention will be apparent from the following detailed description when read in conjunction with the appended claims and attached drawing.

DESCRIPTION OF THE PREFERRED EMBODIMENT

Figure 1:
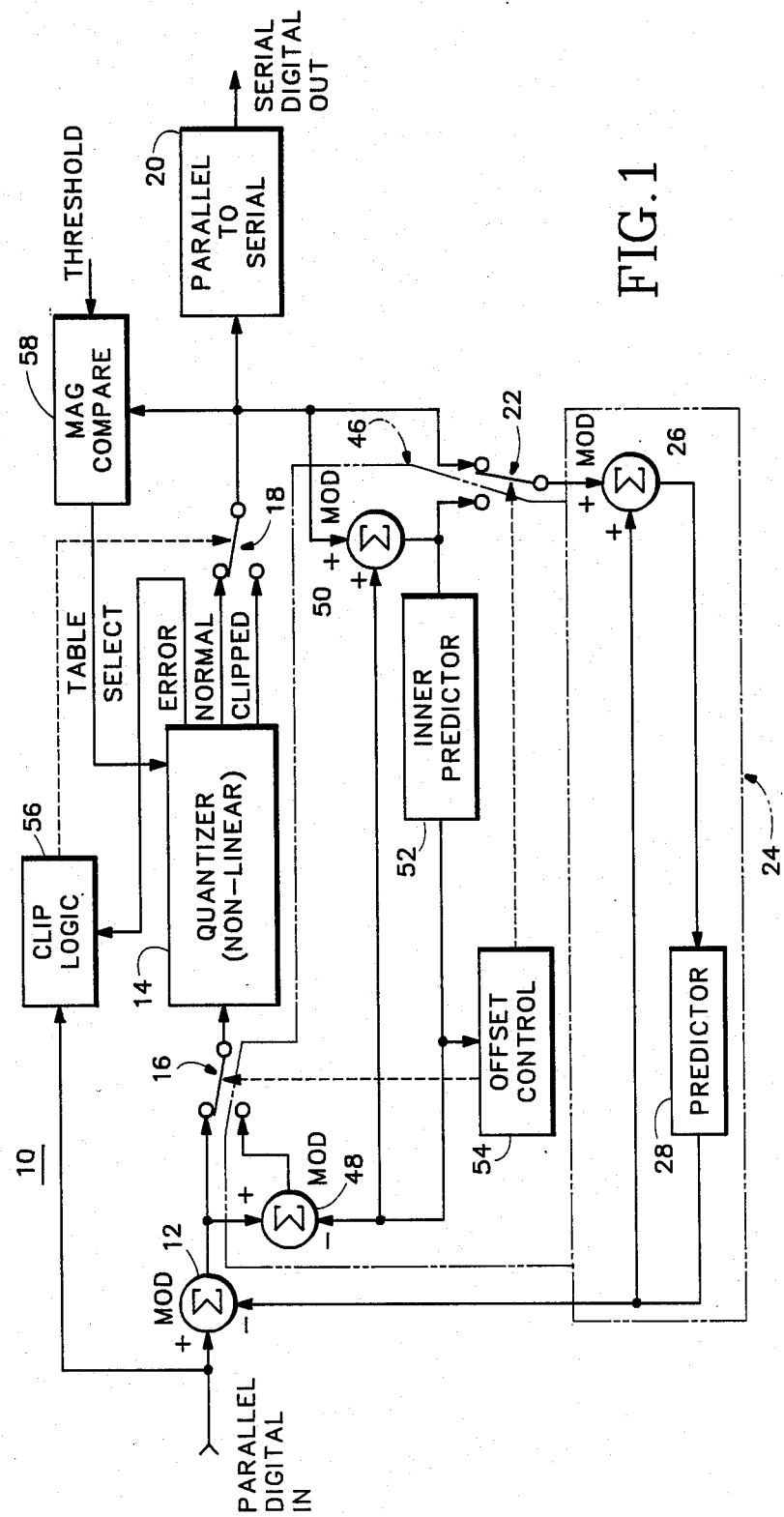
FIG. 1 is a block diagram of an adaptive DPCM encoder according to the present invention.

Referring now to FIG. 1 an adaptive differential pulse code modulated (DPCM) video encoder 10 is shown which receives a parallel digital input signal, such as a digitized NTSC or PAL composite video signal, and outputs a data reduced DPCM serial digital output signal. The input signal is a parallel digital signal which is one input to a first summing circuit 12. The output of the first summing circuit 12 is input to a quantizer 14 via a switch 16. The quantizer 14 provides three outputs in response to the input—an error value, a normal value and a clipped value. The normal value or the clipped value is output from the quantizer 14 via switch 18, coded and converted into the serial output signal for transmission over a telecommunications network by a parallel to serial coder/converter circuit 20. The selected value from the quantizer 14 also is fed back via switch 22 and an outer prediction loop 24 to the first summing circuit 12 where it is subtracted from the input signal. The outer prediction loop 24 has a second summing circuit 26 to which the output of the quantizer 14 via switch 22 is input. The output of the second summing circuit 26 is input to a predictor circuit 28, with the output of the predictor circuit being a second input to the second summing circuit where it is added to the quantizer output to approximately reproduce the input signal within quantization error limits.

Figure 2:
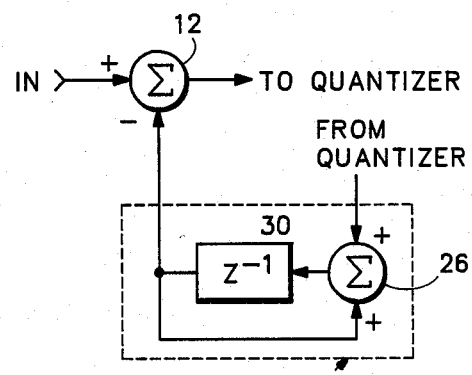
FIG. 2 is a block diagram of a simple DPCM modulator.
Figure 3:
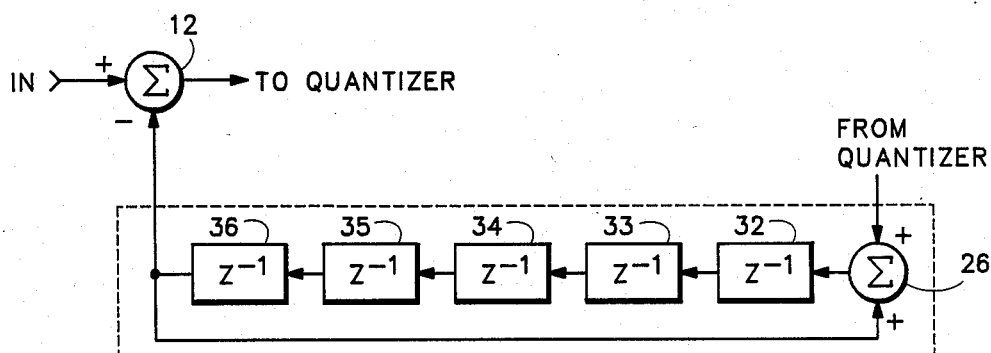
FIG. 3 is a block diagram of a direct encoded video DPCM modulator according to the present invention.
Figure 4:
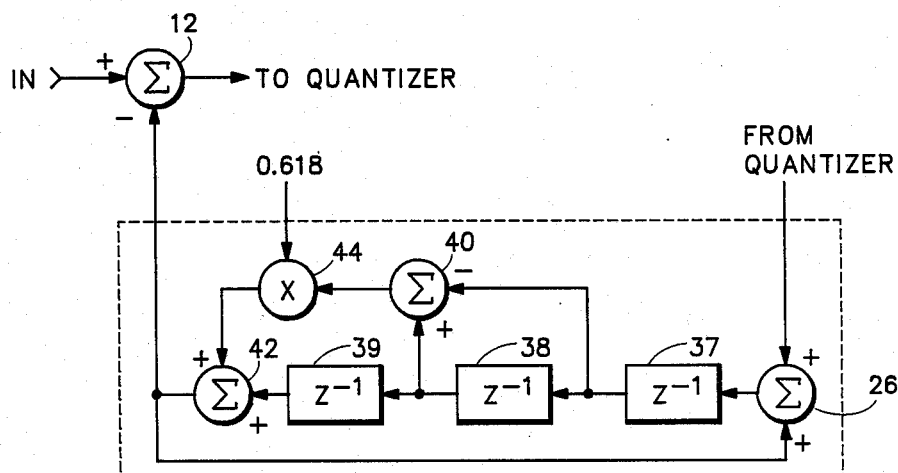
FIG. 4 is a block diagram of an alternative embodiment for the direct encoded video DPCM modulator according to the present invention.
Figure 5:
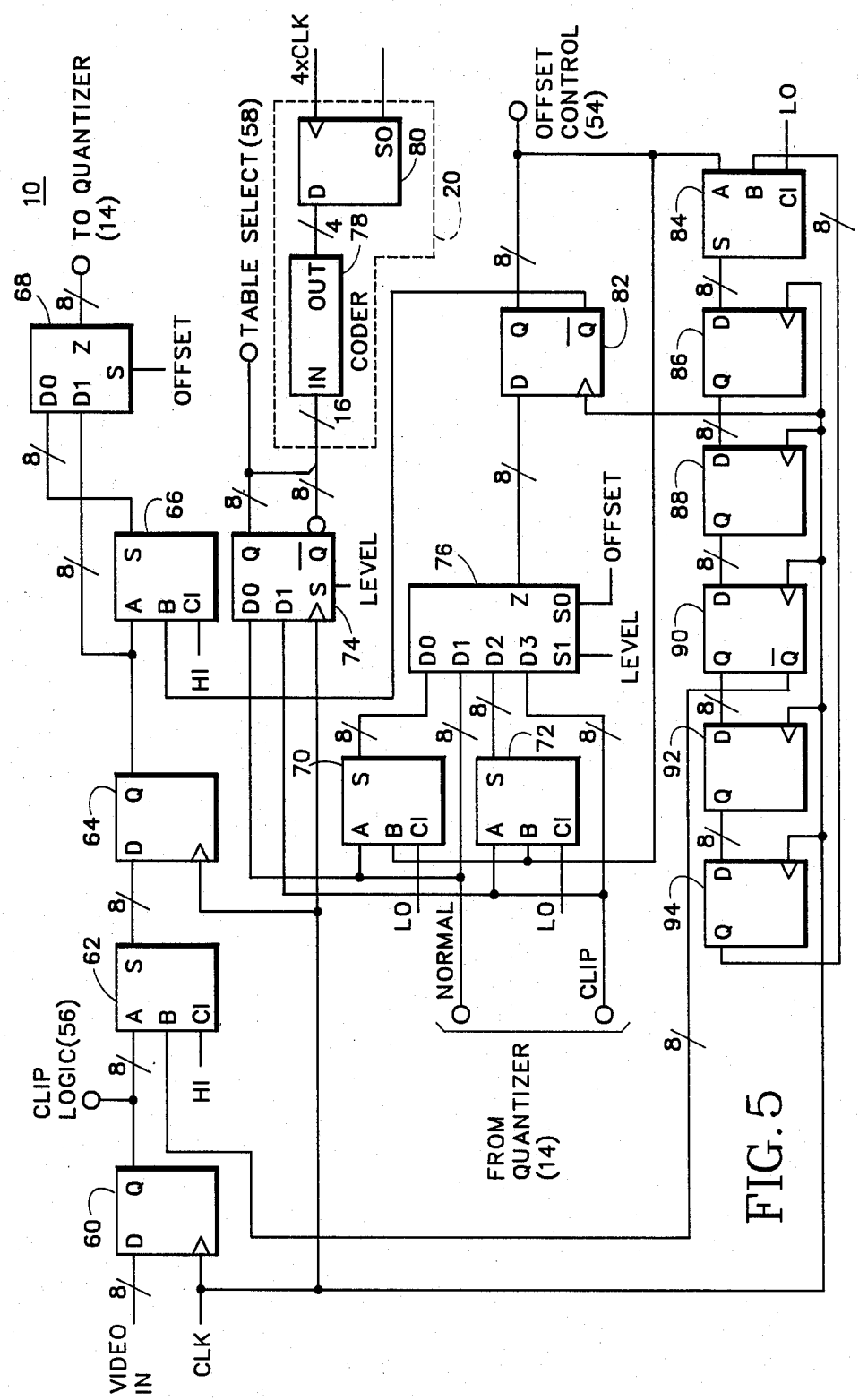
FIG. 5 is a schematic diagram of the DPCM modulator portion of the adaptive DPCM encoder of FIG. 1.

As shown in FIGS. 2-4 the predictor circuit 28 may take several different forms. In the simplest case the predictor circuit 28 is a single delay element 30 so that consecutive samples of the input signal are subtracted from each other in the first summing circuit 12. The difference from the first summing circuit 12 then is added to the output of the delay element 30 by the second summing circuit 26 to produce a predicted value which should equal or very closely approximate the next input signal sample value. For slow changes this simple case is adequate. However for composite video signals where there is a color subcarrier, the changes in the input signal between samples is large reflecting the subcarrier frequency rather than the information modulated on the subcarrier. Therefore this simple case is inadequate for composite video signals, such as NTSC or PAL. To operate directly on the sampled composite video signal the outer loop 24 is transformed into a recursive filter with zero's at d.c. and the subcarrier frequency. For the situation when the input video signal has been sampled at 2.5 times the subcarrier frequency rate, a series of delay elements 32-36, as shown in FIG. 3, form the predictor circuit 28 so that the predicted value from the last delay element 36 occurs at the same point of the subcarrier waveform as the input sample of the composite video signal, i.e., a subcarrier component of the predicted value is in phase with the color subcarrier component of the input composite video signal. Therefore, the resulting differences formed at the output of the first summing circuit 12 are small even though large subcarrier oscillations are present on the input composite video signal. Where the input sampling rate is 2.5 times subcarrier frequency, then five of the delay elements 32-26 provide the necessary phase relationship between the predicted value and the input signal sample.

Alternatively, as shown in FIG. 4, to reduce the overall delay time of the outer loop 24 a more complex predictor circuit 28, formed of three delay elements 37-39 in series, two summing circuits 40, 42 and a multiplier circuit 44, provide a similar result. The outputs of the first and second delay elements 37, 38 are subtracted in one summing circuit 40, and then multiplied by a constant 0.618 in the multiplier circuit 44. The output of the multiplier circuit 44 is added to the output of the third delay element 39 by the other summing circuit 42 to provide the predicted value for input to the first summing circuit 12. This reduces the delay time from five clock cycles down to the theoretical limit of three clock cycles. A simplified analysis of the predictor of FIG. 4 is achieved by ignoring the presence of quantization errors so that the output of summing circuit 26 is identical to the original input to the first summing circuit 12. The transfer function becomes:

$$OUT/IN = 1 + 0.618Z^{-1}{}_1 - 0.618Z^{-1}{}_2 - Z^{-1}{}_3.$$

The right side of the above equation is the transfer function of a filter having zeros at d.c. and at forty percent of the sampling frequency. At a sampling frequency of 2.5 times subcarrier this puts the latter zero at the subcarrier frequency. Thus the chosen predictor loop configuration, whether that of FIG. 3 or FIG. 4, acts as a filter to reduce the amplitude of large low frequency and subcarrier oscillations. Since such frequencies predominate in composite video signals, this tends to keep the signal which is fed to the quantizer near zero. This improves the noise performance of the system because small values can be quantized with very little quantization error.

Since the output of the predictor circuit 28 for a composite video input signal is delayed by three or more delay elements 32-39, the encoder 10 does not respond immediately to abrupt changes, i.e., larger quantization errors that typically occur at large luminance step transitions persist until they can be cancelled by a signal propagated through the delay elements. Such a luminance transition corresponds to the edge of an object and produces objectionable effects if there is delay in cancelling out the large quantization errors. Therefore an inner feedback loop 46 is provided. The inner feedback loop 46 has a third summing circuit 48 to which is input the output of the first summing circuit 12. The output of the third summing circuit 48 is input to the quantizer 14 via switch 16. The output of the quantizer 14 also is input to a fourth summing circuit 50, the output of which is input to an inner predictor circuit 52. The output of the inner predictor circuit 52 is input to the third summing circuit 48 for subtraction from the output of the first summing circuit 12, is input to the fourth summing circuit 50 for addition to the output of the quantizer 14, and is input to an offset control circuit 54 which controls the switches 16, 22 to determine when the inner feedback loop 46 is used. The inner predictor circuit 52 may be implemented simply by a single delay element as shown in FIG. 2, since the subcarrier frequency has already been nulled out at the output of the first summing circuit 12, to inject an offset value at the input of the quantizer 14 that cancels the luminance transition within one clock cycle. The offset control circuit 54 detects the presence of an abrupt luminance change and activates the switches 16, 22 to use the inner feedback loop 46 in conjunction with the outer feedback loop 24 to provide an immediate reaction to the big change in luminance value. Changes in the subcarrier oscillations are detected as such and do not cause the activation of the switches.

The use of the quantizer 14 results in inherent quantization errors which introduce anomalies into the encoder 10, equivalent to adding wideband "white" noise to the original signal. The ability to perceive such noise varies locally within the resulting video image as a function of picture content. Noise in flat areas of an image is much more objectionable than the same noise in a busy area of the picture. Additionally the spectrum of the noise itself affects its visibility. Low frequency noise is easier to perceive than high frequency noise. To achieve minimal degradation of an image the quantization process should differentiate between flat and busy areas of the picture and should ideally add predominately high frequency rather than wideband noise. The insertion of the quantizer 14 within the DPCM modulator loop adds predominately high frequency rather than wideband noise as the loop inserts a zero in the quantization noise transfer function at luminance d.c. (0 Hz) and at chrominance d.c. (subcarrier frequency). In order to reduce the amount of data to be transmitted the quantizer 14 provides a discrete output value for each range of input values, the discrete output value being eventually reduced to a lesser number of bits than the corresponding input sample. Since serial output is desired for telecommunication of video information, the rate of transformation from parallel to serial would be n times the sample rate, where n is the number of bits per sample of the video input signal. For 8-bit samples at 2.5 times subcarrier frequency this requires an output clock twenty times the subcarrier frequency, or for NTSC video signals a clock of 71.6 MHz. This high output clock frequency is beyond the bandwidth of conventional telecommunication networks. Thus the use of the quantizer 14 to reduce the data rate for an output of 4-bit samples reduces the output clock to 35.8 MHz, within the bandwidth of the telecommunication network. Other bit reduction techniques, such as Huffman coding and variable run length encoding, may be used in lieu of the quantization technique described herein.

Figure 12:
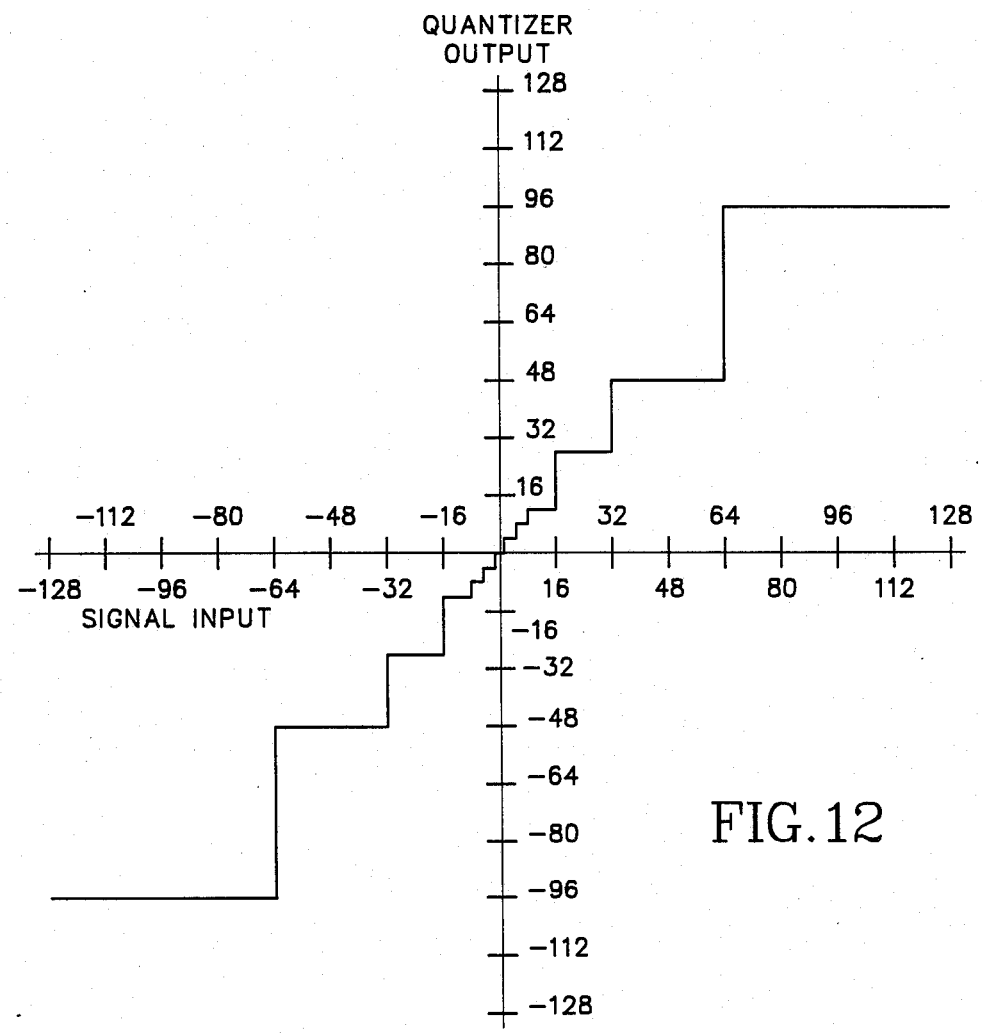
FIG. 12 is a graph representing a fine transform characteristic for the quantizer of FIG. 9.
Figure 13:
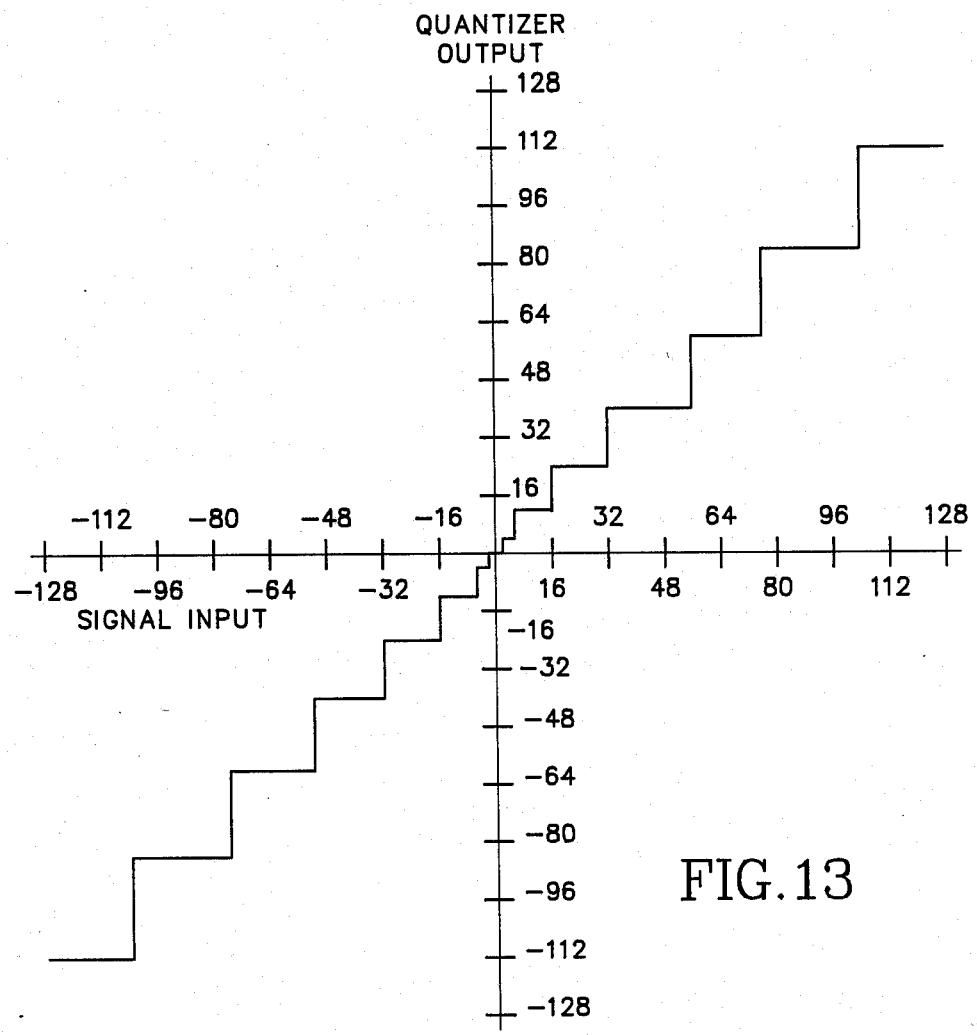
FIG. 13 is a graph representing a coarse transform characteristic for the quantizer of FIG. 9.

However for each quantizer increment there is a corresponding quantizer error value. For the ideal DPCM modulator the input to the quantizer 14 from the first summing circuit 12 is a small value so that quantization steps in that region, with resulting error values, should be small, while for large signal variations larger quantization steps may be acceptable with the concomitant larger error values. Therefore the encoder 10 uses a non-linear quantizer 14 having transfer functions as shown in FIGS. 12 and 13. These transfer functions have very fine resolution for values near zero and coarse resolution for values far from zero which introduce very small quantization errors in flat areas of the image where the difference samples from the first summing circuit 12 are small, while quantizing busy areas of the picture having large difference samples by the coarse section of the transfer function resulting in larger quantization errors. The actual choice of quantization levels is determined empirically within certain constraint rules regarding the maximum distance to the next step level versus the value of the step level. The constraint rules are:

1. the quantized output aalue should lie in the middle of the range of input values rather than at either end of the range to reduce the maximum overshoots by fifty percent; and
2. the number of values in each input range must be less than or equal to the corresponding quantized output value or the quantizer loop may oscillate, i.e., for an input range of 9–16 inclusive having 9 values the quantized output value must be at least 10 to meet the stability requirement.

Clamping techniques used in many video devices can cause streaking of a displayed image if excessive noise is present during the horizontal blanking interval of the video signal. Such streaking due to quantization error is reduced by improving the signal to noise ratio of flat areas of the image. Such signal to noise ratio improvement is accomplished by detecting when the input video signal is relatively constant and switching to a quantization transfer characteristic having finer resolution about zero. The output of the quantizer 14 is input to a magnitude comparison circuit 58 which compares the output with a threshold value. If the threshold value is exceeded, then a coarse quantization transfer function, such as that shown in FIG. 13, is selected by a table select signal to the quantizer 14 from the magnitude comparison circuit 58. If the threshold value is not exceeded, then a fine quantization transfer function, such as that shown in FIG. 12, is selected. The currently used table, or quantization transfer function, from the quantizer 14 is determined by the previous quantized difference output.

A specific implementation of the present invention is illustrated in FIGS. 5–9. The input video samples are input to a latch 60 as an 8-bit parallel data word. The output of the latch 60 is connected to an adder 62 which forms the first summing circuit 12. For an eight bit wide input sample the output of the first summing circuit 12, i.e., the DPCM output before quantization, can range from −255 to 255, requiring subsequent stages to be capable of handling nine bit wide samples, the eight bits plus sign. FIG. 10 illustrates a sampled input signal and the corresponding nine bit DPCM output. By using modulo 256 adders, such as for adder 62, the width of the output is reduced by one bit with a range from −128 to 127, the most significant bit being a sign bit, producing the eight bit DPCM output also illustrated in FIG. 10. As shown for a step of 255 the DPCM output wraps around to −1, for a step of −255 the DPCM output wraps around to +1, and for a step of 128 the output wraps around to −128. Steps between −128 and 127 do not exhibit wraparound. The output of the adder 62 is input to a first delay element 64, and the output of the first delay element is input to a second adder 66 and to a first multiplexer 68. The second adder 66 corresponds to the third summing circuit 48 and the first multiplexer 68 corresponds to switch 16. The output of the first multiplexer 68 is input to the quantizer 14. The NORMAL and CLIP outputs of the quantizer 14 are input respectively to adders 70, 72 as well as to multiplexers 74, 76. Adders 70, 72 correspond to fourth summing circuit 50, multiplexer 74 corresponds to switch 18 and multiplexer 76 performs the functions of both switches 18 and 22 for the outer predictor circuit 24. The output of multiplexer 74 is input to a coder circuit 78 to produce a four-bit parallel DPCM output signal which in turn is converted into a serial output by a parallel to serial converter 80 clocked at four times the sample clock rate.

The output of multiplexer 76 is input to a second delay element 82 which serves also as the inner predictor 52. The /Q output of the second delay element 82 is input to the adder 66 for subtraction from the output of the first delay element 64. The Q output of the second delay element 82 is input to the adders 70, 72 for addition to the outputs of the quantizer 14 to complete the inner feedback loop 46. The Q output of the second delay element 82 is input also to another adder 84 corresponding to the second summing circuit 26. The output of the adder 84 is input to a third delay element 86, the output of which is input to a fourth delay element 88, the output of which is input to a fifth delay element 90. Delay elements 64, 82, 86, 88, 90 correspond to delay elements 32–36 of FIG. 3. The /Q output of the fifth delay element 90 is input to adder 62 for subtraction from the input signal from latch 60. The Q output of the fifth delay element 90 is input to a sixth delay element 92, the output of which is input to a seventh delay element 94, the output of which is input to adder 84 so that the inputs to the adder correspond to the same phase of the nulled subcarrier signal.

Figure 6:
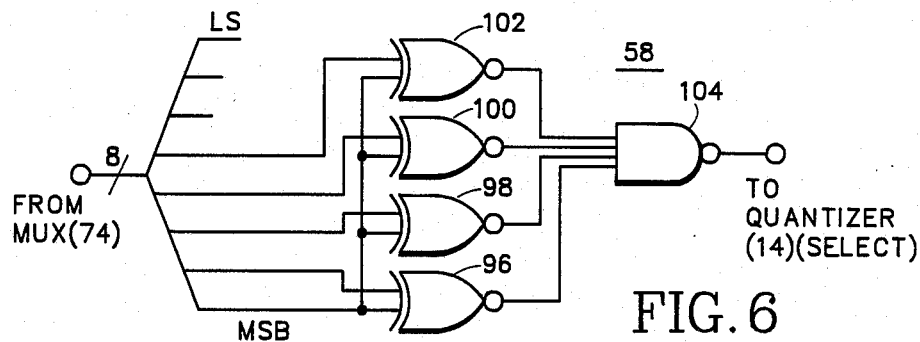
FIG. 6 is a schematic diagram of a table selection circuit for a quantizer used in the adaptive DPCM encoder of FIG. 1.

The magnitude comparison circuit 58 uses the five most significant bits from the Q output of multiplexer 74 as shown in FIG. 6. The most significant bit MSB, or sign bit, is input to each of four exclusive NOR gates 96, 98, 100, 102. The remaining most significant bits are input respectively to the four exclusive NOR gates 96, 98, 100, 102 for combination with MSB. The outputs from the exclusive NOR gates are input to a NAND gate 104 to produce the table SELECT signal for the quantizer 14. The threshold is determined by the value of the most significant bits so that if the five most significant bits are not the same, then the coarse quantization transfer function is selected, and if all of the five most significant bits are the same, then the fine quantization transfer function is selected, i.e., the coarse quantization transfer function is used in busy areas of the picture and the fine quantization transfer function is used in the flat areas.

Figure 7:
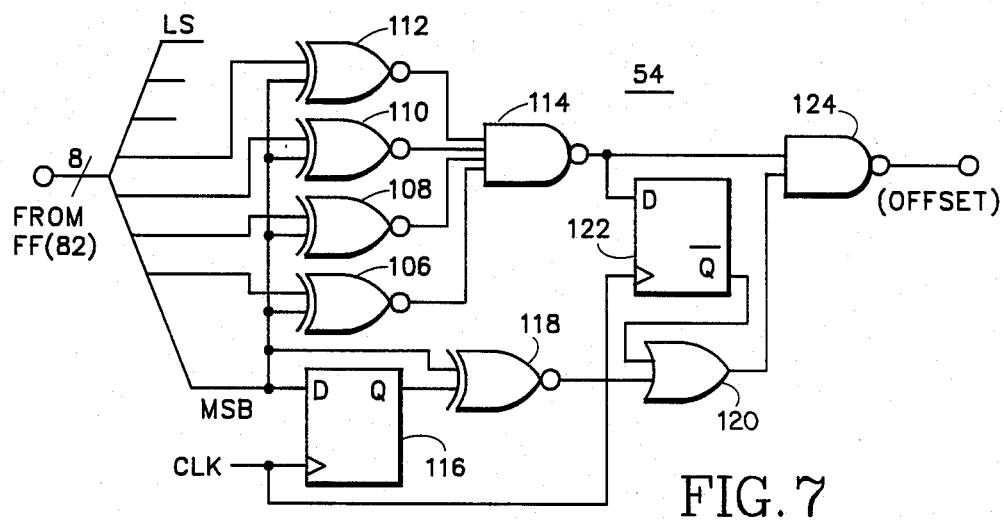
FIG. 7 is a schematic diagram of an offset controller for the adaptive DPCM encoder of FIG. 1.

Referring now to FIG. 7 the Q output from the second delay element 82 is input to the offset controller circuit 54, with the five most significant bits being used. The MSB, or sign bit, and the other four most significant bits are input to exclusive NOR gates 106, 108, 110, 112 with the outputs of the exclusive NOR gates being input to a NAND gate 114 as in FIG. 6. The sign bit is input also to a delay element 116 and another exclusive NOR gate 118. The output of the delay element 116 is input to exclusive NOR gate 118, and the output of the exclusive NOR gate is input to an OR gate 120. The output from the NAND gate 114 is input to another delay element 122, the output of which also is input to the OR gate 120. The outputs of the OR gate 120 and NAND gate 114 are input to another NAND gate 124 to produce the OFFSET signal which controls multiplexers 68, 76. If the sign bits between consecutive samples are equal, the offset controller circuit 54 assumes the transition is a luminance step transition and activates the inner loop by generating the OFFSET signal to cancel the step. If the consecutive sign bits are opposite, the offset controller assumes that the transition is part of a large amplitude oscillation, such as the subcarrier frequency, and leaves it for the outer loop 24 to cancel. However, when the quantizer value is small, noise causes the sign bit to switch randomly back and forth which could cause the offset controller 54 to miss a luminance transition if the immediately preceding sample was a small value of the opposite sign. The four exclusive NOR gates 106, 108, 110, 112 plus the NAND gate 114 form a threshold detector which is used to activate the inner feedback loop 46 if the amplitude switches from below threshold to above threshold regardless of the result of the sign bit comparison.

Figure 8:
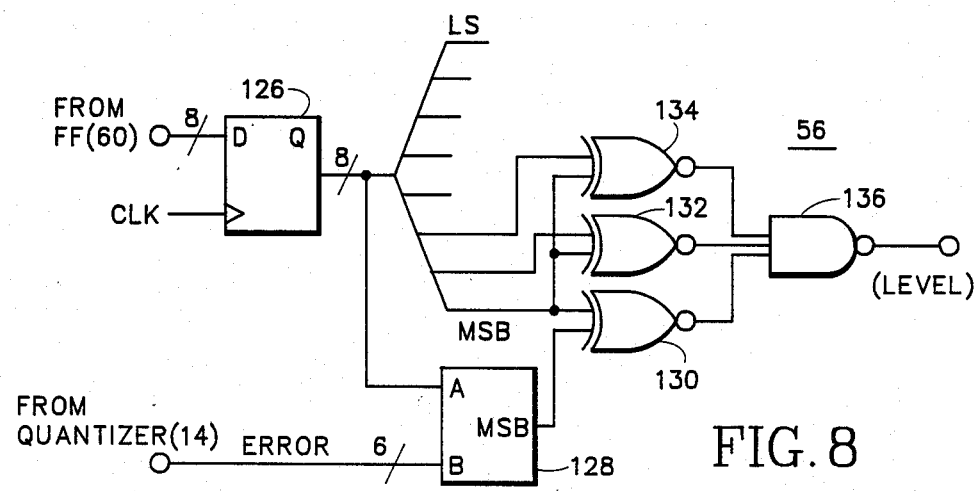
FIG. 8 is a schematic diagram of a clip logic circuit for the adaptive DPCM encoder of FIG. 1.
Figure 11:
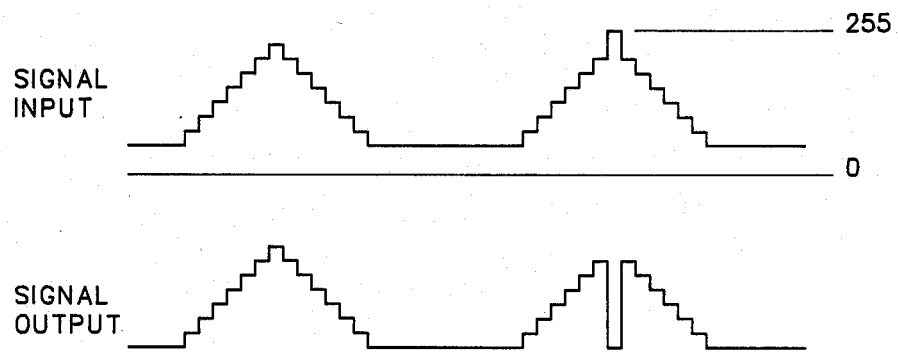
FIG. 11 is a graph representing the operation of the clip logic circuit of FIG. 8.

The use of modulo techniques in summing circuits 12, 26, 48, 50 can cause wraparound of the final composite video output from a receiver decoder due to quantization errors if insufficient headroom is left above and below the quantizer input signal to accommodate worst case quantization errors, i.e., a value near max (or min) may be altered to be a min (or max) value respectively as shown in FIG. 11. In non-linear quantizers where fine resolution is achieved about zero at the expense of coarse resolution elsewhere, the required headroom is significant, i.e., a +/−32 quantization error for an eight bit wide signal limits the range to (32 to 223), effectively eliminating one fourth of the usable input levels as a forbidden region. To eliminate such receiver wraparound errors without incurring headroom penalties, the input video signal from the latch 60 is input to the clip logic circuit 56 as shown in FIG. 8. The initial input of the clip logic circuit 56 is a delay element 126 to provide the same amount of delay as provided by the first delay element 64 prior to the quantizer 14. The output of the delay element 126 is input to an adder 128 to which also is input the quantization error value from the quantizer 14. This sum of input and quantization error is exactly the value which will be output from the receiver decoder, and should have the same sign as the input when the input is near its max or min value. The output of the adder 128 is input together with the MSB (sign bit) to an exclusive NOR gate 130. The sign bit also is input to exclusive NOR gates 132, 134 with the other inputs being respectively the next two most significant bits from the delay element 126. The outputs of the NOR gates 130, 132, 134 are input to a NAND gate 136, the output of which is a change LEVEL signal to multiplexers 74, 76. If the input signal is near a limit of its range, i.e., in the forbidden region, ad the sign bit changes when the error value from the quantizer 14 is added to the input signal, then the LEVEL signal causes the quantizer output to change to the clipped value which is one quantizer level below or one quantizer level above the normal value depending upon the sign of the error value being positive or negative, respectively.

Figure 9:
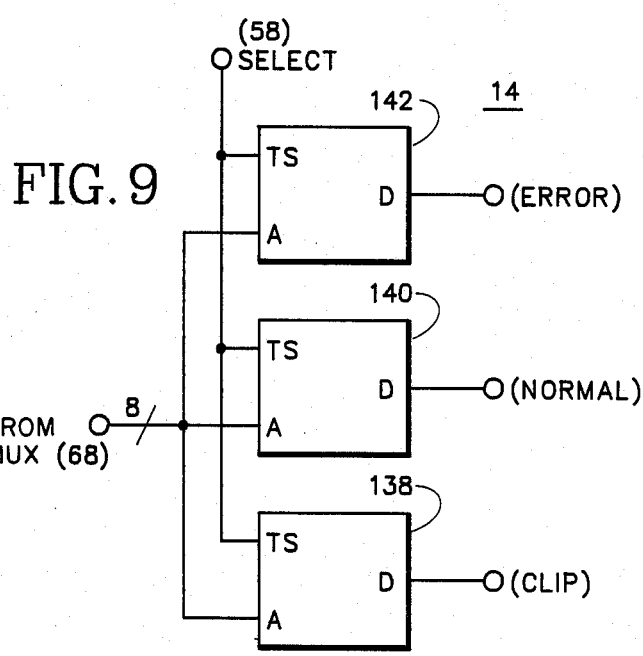
FIG. 9 is a schematic diagram of a quantizer for the adaptive DPCM encoder of FIG. 1.
Figure 10:
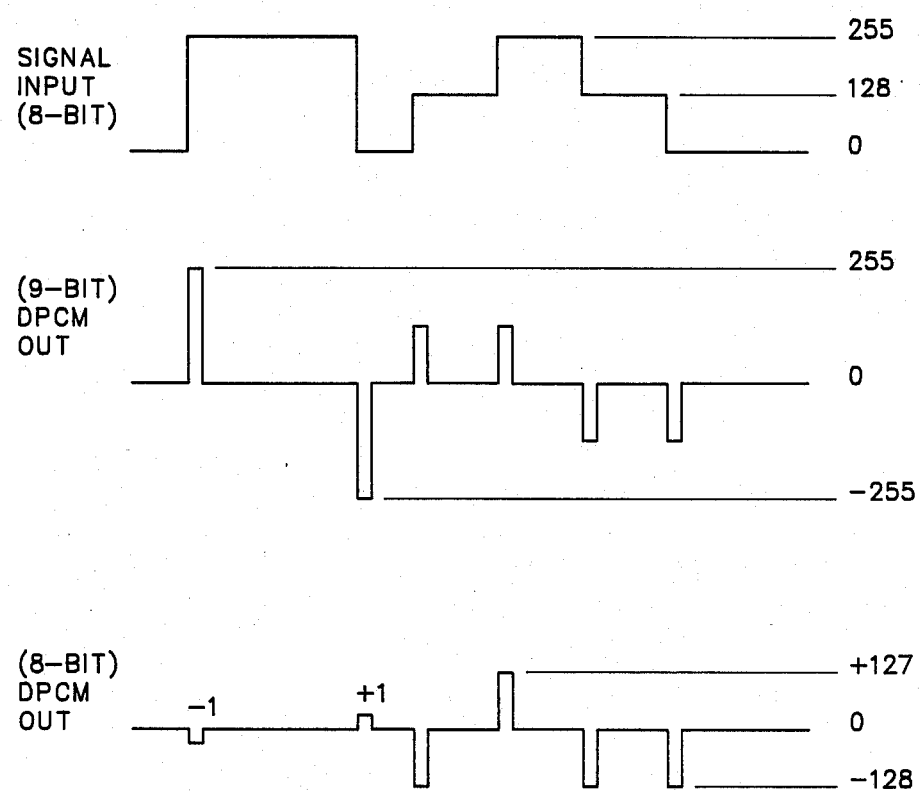
FIG. 10 is a graph representing the operation of a modulo bit reduction technique for the adaptive DPCM encoder of FIG. 1.

As shown in FIG. 9 the quantizer 14 may be implemented by three memory devices 138, 140, 142, such as ROMs, that are capable of storing multiple tables selectable by the SELECT signal from the magnitude comparison circuit 58. The input signal from the latch 60 that has 256 values for an eight bit input signal serves as an address for all memory devices 138, 140, 142 and the quantized value that has fifteen values with an eight bit output is output at the respective data terminals to provide the NORMAL, CLIP and ERROR quantized values.

In operation a digitized composite video signal is input to the encoder 10 as a parallel bit stream. For small step increments between samples a predicted value from the outer loop is subtracted from the input sample to produce a difference signal. The difference signal is quantized by the fine resolution of the quantization transfer function to form a quantized difference signal which is converted to a reduced bit serial digital output signal. The quantized difference signal also is added to the predicted value and input to the predictor circuit 28 to provide the predicted value. The quantized difference signal is input to the inner loop 46 where it is added to an offset value and input to an inner predictor 52 to produce the offset value. The offset value is examined by the offset control circuit 54 to determine whether the transition between samples is due to a luminance or chrominance subcarrier change. When the offset control circuit 54 detects a luminance transition, then the cffset value is subtracted from the difference signal and an offset difference signal is quantized by the coarse resolution of the quantization transfer function to provide rapid response to such luminance transitions. The quantized difference signal also is examined by a magnitude comparison circuit to determine which quantization transfer function, or table, should be used depending upon the size of the transition between samples. The input signal is input also to a clip logic circuit 56 to determine whether due to quantization error the quantized difference signal will wrap around and produce an erroneous output indication due to insufficient headroom. If wraparound is likely, then a clipped quantized difference signal is output from the quantizer. The clipped or normal quantized difference signal is bit reduced by the parallel to serial coder/converter 20 to produce the bit reduced serial digital output signal for transmission over a communication network.

Thus the present invention provides an adaptive DPCM video encoder for operating directly upon an composite video signal that uses non-linear dual loop quantization and a recursive feedback filter with zero's at d.c. and the color subcarrier frequency to produce a bit reduced serial output signal for transmission over a communication network.

What is claimed is:

1. An apparatus for directly encoding a sampled composite video signal having a color subcarrier component into a bit reduced serial digital output signal comprising:

means for nulling out the color subcarrier component from the sampled composite video signal to produce a difference signal having a high probability of values near zero, the difference signal representing information contained in the sampled composite video signal; and means for converting the difference signal into the bit reduced serial digital output signal.

2. An apparatus as recited in claim 1 wherein the converting means comprises:
means for quantizing the difference signal to produce a quantized difference signal; and
means for encoding the quantized difference signal to produce the bit reduced serial digital output signal.

3. An apparatus as recited in claim 2 wherein the quantizing means comprises means for shifting the quantized difference signal to produce a clipped quantized difference signal when the value of the sampled composite video signal is near maximum or minimum allowed values to prevent wraparound due to quantization errors.

4. An apparatus as recited in claim 2 wherein the quantizing means comprises means for selecting one of a plurality of quantization transfer functions based upon the quantized difference signal, the selected quantization transfer function being applied to the sampled composite video signal to produce the quantized difference signal for the next sample.

5. An apparatus as recited in claim 2 wherein the quantizing means comprises a non-uniform quantization transfer function having very fine resolution for values of the difference signal near zero and coarse resolution for values of the difference signal away from zero.

6. An apparatus as recited in claim 5 wherein the non-uniform quantization transfer function comprises a plurality of levels, each level having an output value which is in the middle of a range of corresponding input values and is greater than or equal to the number of values in the range.

7. An apparatus as recited in claim 1 wherein the nulling means comprises a differential pulse code modulator having a feedback path that provides a predicted sample for subtraction from the sampled composite video signal to produce the difference signal, the predicted sample being derived from the difference signal and having a subcarrier component which is in phase with the color subcarrier component.

8. An apparatus as recited in claim 7 wherein the nulling means further comprises:
an inner loop having the difference signal as an input and providing an offset value as an output; and
means for switching the inner loop into the feed back path when the offset value represents a luminance transition of the sampled composite video signal in order to generate an offset difference signal for input to the converting means, the offset difference signal becoming the difference signal.

9. An apparatus as recited in claim 7 wherein the nulling means comprises:
a first summing circuit having as inputs the sampled composite video signal and the predicted sample, and as an output the difference signal;
a second summing circuit having as inputs the difference signal and the predicted sample, and as an output a sample signal corresponding approximately in value to the sampled composite video signal; and
a prediction circuit having as an input the sample signal and as an output the predicted sample.

10. An apparatus as recited in claim 9 wherein the first and second summing circuits comprise modulo adders to reduce the bit width of the difference signal.

11. An apparatus as recited in claim 7 wherein the feedback loop comprises:
means for adding the predicted signal to the difference signal to produce a sample signal; and
means for delaying the sample signal to produce the predicted signal.

12. An apparatus as recited in claim 6 wherein the delaying means comprises a plurality of delay elements connected in series, the number of delay elements being a function of the color subcarrier component and of the rate at which the sampled composite video signal is sampled so that the subcarrier component of the predicted signal is in phase with the color subcarrier component.

13. An apparatus as recited in claim 11 wherein the delaying means comprises:
a plurality of delay elements connected in series, the number of delay elements being a function of a theoretical sampling limit for the sampled encoded video signal; and
means for obtaining weighted summations of the outputs of the delay elements to produce the predicted signal with the subcarrier component in phase with the color subcarrier component.

14. An apparatus as recited in claim 11 wherein the adding means comprises a modulo $2^n$ adder where n is the number of bits per sample of the sampled composite video signal in order to limit the range of the difference signal from $-2^{n-1}$ to $2^{n-1}-1$ in order to reduce the number of bits of the difference signal by one.

15. An apparatus as recited in claim 11 further comprising means for quantizing the difference signal to produce a quantized difference signal, the quantized difference signal being input to the feedback loop to produce the predicted signal.

16. An apparatus as recited in claim 15 further comprising:
an inner feedback loop to provide an offset signal from the quantized difference signal for subtraction from the difference signal to produce an offset difference signal in order to quickly compensate for luminance transitions in the sampled composite video signal;
means for detecting from the offset signal the luminance transitions to generate an offset command; and
means for switching in response to the offset command the inner loop into the feedback loop so that the offset difference signal is input to the quantizing means to produce the quantized difference signal, the inner loop operating in parallel with the feedback loop.

17. An apparatus as recited in claim 15 wherein the quantizing means comprises means for selecting one of a plurality of quantization transfer functions to use on the difference signal to produce the quantized difference signal, the selected quantization transfer function being determined by the difference in value between consecutive samples of the quantized difference signal.

18. An apparatus as recited in claim 15 wherein the quantizing means comprises a non-uniform quantization transfer function having very fine resolution for values of the difference signal near zero and having coarse resolution for values of the difference signal away from zero.

19. An apparatus as recited in claim 18 wherein the non-uniform quantization transfer function comprises a plurality of levels, each level having an output value for the quantized difference signal which is in the middle of a range of input values from the difference signal defined for that level and is greater than or equal to the number of input values in the range.

20. An apparatus as recited in claim 19 wherein the quantizing means comprises:
  means for detecting when the sum of the sampled composite video signal and a quantization error signal for the level corresponding to the difference signal are outside established limits; and
  means for shifting the level for the quantized difference signal to prevent the quantized difference signal from being outside the established limits.

* * * * *